MEASURING BAG

United States Patent Office 3,725,007
Patented Apr. 3, 1973

3,725,007
TEST TUBE FOR THE QUANTITATIVE DETECTION OF THE ALHOCOLIC STRENGTH OF RESPIRATORY AIR AND METHOD FOR THE PREPARATION OF SAID TUBE
Erwin F. Kral and Dieter Eschrich, Bad Lanpeusaka, Germany, assignors to VEB Jenapharm, Jena, Germany
Filed Jan. 28, 1971, Ser. No. 110,548
Claims priority, application Germany, Feb. 17, 1970, P 42 11 455.6
Int. Cl. G01n 31/22
U.S. Cl. 23—254 R     5 Claims

ABSTRACT OF THE DISCLOSURE

A test tube for the quantitative detection of the alcohol content of breath by means of bichromate-sulphuric acid. The test tube contains a carrier material consisting of silica-gel powder bonded to glass particles and saturated with a reagent for indicating the alcohol content. The test tube is provided with a scale in the region of the reagent for indicating the alcohol content for the determination by linear colorimetric means of the amount of alcohol contained in the breath.

---

This invention relates to a test tube for the quantitative detection of the alcohol content of breath on a basis of bichromate-sulphuric acid on silica gel.

It is already known to detect the alcohol content of breath by reduction of chromium (VI) compounds to chromium (III) compounds in a strong sulphate medium. Moreover, a process is known in which silica gel having a large surface area and a small particle size is saturated with chromosulphuric acid and the volume of air blown through is determined by means of a reversible thermocolor dye coated on the outer surface of the tube. A solution of dithizon is sealed in a destructible ampul in the unfilled portion of the tube.

It is also known that the volume measurement required for a determination of the alcohol content may take place by means of a moisture content of the breath, which is constant at 37° C., using a water-indicating reaction medium. In this process, a layer of uniformly fine-grained blue gel is connected to the alcohol-indicating reaction mass. The absorption of alcohol taking place in this layer is to be taken into account in the evaluation of the alcohol reading from the outset.

Test tubes are also known in which a layer provided with the reagent is attached to the inside wall of the tube or to the jacket of the packing to be inserted. The packing must be kept in its position by indentations.

All the known processes have the disadvantage that because of the large inner surface and small particle size of the silica gel used as well as the large amount of sulphuric acid necessarily coated on such gel (in any case for more than 10 percent relative to the chemical), no satisfactory separation of breath moisture and breath alcohol takes place. Thus a quantitative longitudinal colorimetric determination of alcohol in the breath is not possible in a range under 1.5 per thousand.

The amount of alcohol, which is very small in relation to the moisture of the breath, completely dissolves in the water absorbed by the mixture of silica gel and sulphuric acid, so that depending on the alcohol content of the breath only zones of approximately equal length and different colours form. The required evaluation of the tests by means of colour comparison is affected by trial and error, as compared with the quantitative longitudinal colorimetric evaluation. Under varying light conditions the evaluation of the color comparison is frequently impossible.

Moreover, the high amount of chromate required by the large inner surface of the silica gel renders a longitudinal colorimetric evaluation at varying alcohol concentrations difficult. The reaction layers used in such process prevent the volume measurement by means of a subsequent water-indicating layer, which is required for a quantitative alcohol indication. The attempt to mark the volume reading by an insert blue-gel layer results in an additional reduction of the breath alcohol concentration, since no separation of water and alcohol takes place in the blue-gel layer.

The volume measurement by means of thermocolor dye has the disadvantage of colour comparison as well as that of influence of the external temperature on this dye, which reversibly changes colour in the temperature range from 43 to 47° C. Moreover, this process has the drawback that at alcohol concentrations lower than 1.5% per thousand an additional detection by means of dithizon is required which nevertheless does not permit a linear colorimetric evaluation of the alcohol content.

None of the forms of test tube devices provided with a packing assures that the entire test medium flowing through the gap formed in the tube comes into contact with the reagent which is essential for a quantitative determination.

Passing the gas (to be tested) between two concentric cylinder surfaces either of which surface is provided with the indicating layer proves to be unfavourable since a wide gap has too low a resistance to the test medium, which thus immediately spreads to the space available for such medium. However, if a narrow gap is used, then the flow velocity of the gas to be tested is correspondingly high and the retention time in the test tube is substantially reduced and no complete reaction can take place. The uniform flow of the test medium on all sides which is required for the formation of a zone permitting direct quantitative evaluation, can scarcely be achieved since even the slightest tilt of the packing with respect to the test tube is sufficient for this condition not to be satisfied. Therefore, a quantitative evaluation of the reading is not possible in any of these cases.

According to the present invention the above problem is solved by a reduction of the surface of the carrier material required for the detection of alcohol. The inner surface, which interferes with a progressive alcohol reading, is removed by firmly bonding to glass or quartz particles or plastic granulates saturated with sodium tetrasilicate one of the following materials: silica gel powder, aluminum oxide granulate or zeolite powder or granulated powder of ceramic masses or materials which are used for the production of molecular sieves and which have an average particle size of between 0.25 and 1.5 mm. and preferably less than 1 mm.

The fixing of the pulverulent materials to the glass or quartz particles saturated with sodium tetrasilicate is required in order to prevent a separation of the two material groups into two phases during drying. By a separation into two phases, a uniform distribution of the chemicals on the carrier material is no longer assured. After fixing, the surface of the carrier depends only on the amount of pulverulent material applied.

For the production of the carrier material, silica gel powder or aluminium oxide granulate or granulated powder of ceramic masses or materials which are used for the production of molecular sieves and which have a particle size of less than 0.1 mm. are finel ydivided and uniformly applied to purified glass or quartz particles or plastic granulates treated with sodium tetrasilicate. The carrier material thus produced is then saturated with the corresponding amount of bichromate-sulphuric acid. In order to improve the fluidity of the reagent thus prepared, a small amount of the powder is added which spreads uniformly on the carrier material. The alcohol-indicating layer of material thus obtained is placed in tubes each of which is provided with a corresponding scale. The tubes are sealed at both ends. The filling of the tube contains the above stated ingredients in a weight ratio of silica-gel, aluminium oxide or zeolite:potassium dichromate:sulphuric acid of approximately 10:0.1 to 0.3:3 to 11.

The volume of the breath can be determined using a measuring bag or with a subsequent water-indicating layer.

The accompanying drawings illustrate different embodiments of test tube devices according to the present invention, in which.

Figure 1:
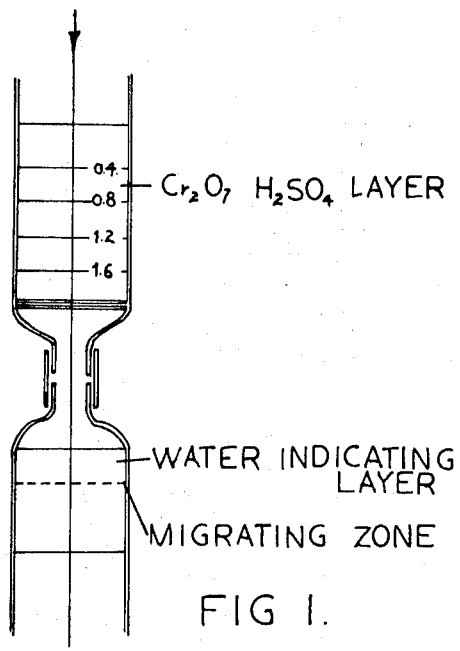
FIG. 1 shows a test tube consisting of two sealed ampoules. The upper ampoule contains the alcohol detecting layer bearing bichromate-sulphuric acid and the lower ampoule contains a water-indicating layer.
Figure 2:
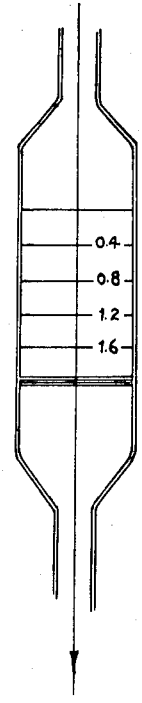
FIG. 2 shows a test tube adapted to have a measuring bag connected to the outlet end thereof to enable the volume of breath to be determined.
Figure 3:
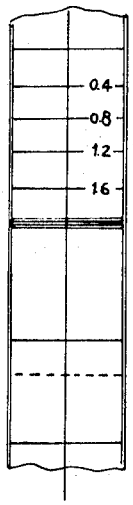
FIG. 3 shows a further embodiment of a test tube according to the invention which is characterized in that the alcohol- and the water-indicating layers are provided in one and the same tube.

In each case the test tube is provided with a suitable scale on the perimeter wall thereof.

The test tube produced in accordance with this invention has the following favourable properties:

(a) The reaction of alcohol with the chromosulphuric acid, which takes place only on the outer surface, results in a continuously extending colour zone which is directly proportional to the alcohol content of the breath.

(b) The use of a small, exactly pre-determined amount of sulphuric acid which constitutes less than 10 percent by weight of the chemicals and the small surface of the carrier material reduce the water absorption to such an extent that an exact volume measurement is made possible by a subsequent layer sensitive to water. The amount of sulphuric acid is so chosen that, with the amount of chemicals constant, the water enters the subsequent water-sensitive layer after exactly one litre of breath and the test is thus completed.

(c) The extension of the colour zone front thus achieved at low alcohol content and low water absorption assure a separating effect of alcohol and breath moisture which is separating effect of alcohol and breath moisture which is much more favourable than that of the chemicals proposed heretofore.

The invention will now be described in greater detail in the following practical examples of suitable carrier materials.

EXAMPLE 1

500 g. of glass particles having a particle size of 0.25 to 0.4 mm. of which have been purified with sulphuric acid are uniformly saturated with 100 to 140 ml. of sodium tetrasilicate in a rotating tank. After the continuous application of 100 to 150 g. of silica gel powder with a particle size of less than 0.1 mm. the mass obtained is dried at 180° C. The porous crude product is then pulverized, the desired range of particle sizes is screened out and is dried once more prior to use.

100 g. of the carrier material thus obtained, which has particle size of 0.6 to 1 mm., are saturated with a solution of 0.3 g. of potassium bichromate in 6 ml. of 90% sulphuric acid, and 3 g. of silica gel powder having a particle size of less than 0.1 mm. is added thereto.

EXAMPLE 2

500 g. of quartz particles having a particle size of 0.25 to 0.4 mm. which have been purified with sulphuric acid are uniformly saturated with 125 ml. of sodium tetrasilicate in a rotating tank. After the continuous application of 100 g. of silica-gel powder having a particle size of less than 0.1 mm., the mass is dried at 180° C. The further treatment is similar to that described in Example 1.

EXAMPLE 3

500 g. of glass particles having a particle size of 0.25 to 0.40 mm. which have been purified with sulphuric acid are saturated with 125 ml. of sodium tetrasilicate in a rotating tank. After the application of 125 g. of aluminium-oxide granulate having a particle size of less than 0.1 mm., the mass is dried at 180° C. The further treatment is similar to that described in Example 1.

EXAMPLE 4

500 g. of polytetrafluoroethylene granules having a particle size of 0.4 to 0.6 mm. which have been purified in the above stated manner are uniformly saturated with 125 ml. sodium tetrasilicate. After the continuous application of 100 g. zeolite powder with a particle size of less than 0.1 mm., the mass obtained is dried at 180° C. The further treatment is similar to that described in Example 1, in which, however, the particle size of the material screened out lies in the range of 0.8 to 1.2 mm.

EXAMPLE 5

500 g. quartz particles having a particle size of 0.6 to 0.8 mm. which have been purified in the manner described in Example 1 are uniformly saturated with 100 ml. sodium tetrasilicate. After the continuous application of 150 g. aluminium oxide powder with a particle size of less than 0.1 mm., the mass obtained is dried at 180° C. The further treatment is similar to that described in Example 1, in which, however, the particle size of the material screened out lies in the range of 1.0 to 1.5 mm.

The material prepared according to the Examples 1 to 5 is placed in the tubes provided with a calibrated scale.

The scale is calibrated to indicate the correspondence between the particle size of the screened out material prepared for the laying on of the bichromate-sulphuric acid reagent in relation to the length of the filling in the tube in accordance with the following table

| Particle size of the material fit for the saturating with bichromate-sulphuric acid, mm.: | Length of tube filling, mm. |
| --- | --- |
| 0.6 to 1.0 | about 20 |
| 0.8 to 1.2 | about 30 |
| 1.0 to 1.5 | about 40 |

The scale fitted may, for example, be provided with graduations for 0.4 to 0.8, 1.2, 1.6 and 2.0 per thousand which can be read with a guaranteed exactness of ±0.2 per thousand.

In the above manner plastics for example, polytetrafluoroethylene granulate, can be processed for the production of the carrier material.

We claim:

1. A test tube for the quantitative detection of the alcohol content in breath, characterized in that for an air resistance of 40 to 80 mm. water column the tube contains a filling, 20 to 40 mm. in length, which consists of particles of quartz sand, ground glass or plastics granulates of any structure and an average size of between 0.25 and 1.5 mm. diameter and to which potassium dichromate-sulphuric acid, serving as a reagent, is applied by means of silica gel powder, aluminium oxide powder or zeolite powder in a weight ratio of silica gel, aluminium oxide or zeolite:potassium dichromate:sulphuric acid of approximately 10:0.1 to 0.30:3 to 11, and that the test tube is provided with a calibrated scale in the region of the filling.

2. A test tube for the quantitative detection of the alcohol content of breath by means of bichromate-sulphuric acid, characterized in that the test tube contains a filling consisting of a non-porous material including an inert binder and a porous material joined to said non-porous material by means of said binder, said filling being dried, pulverized and classified to a fraction of a grain size between .5 to 1.5 mm. and impregnated with said bichromate-sulphuric acid.

3. A test tube according to claim 2, wherein said filling consists of a porous material selected from the group consisting of aluminum oxide and zeolite powder bonded to a non-porous material selected from the group consisting of glass particles, quartz particles and plastic granulates.

4. A test tube according to claim 2, wherein said filling consists of silica gel bonded to a non-porous material selected from the group consisting of quartz particles and plastic granulates.

5. A test tube according to claim 2, wherein said binder is sodium tetrasilicate.

References Cited

UNITED STATES PATENTS

| | | | |
|---|---|---|---|
| 3,131,030 | 4/1964 | Grosskopf | 23—254 R |
| 3,350,175 | 10/1967 | McConnaughey | 23—254 R |
| 3,437,448 | 4/1969 | Miczka | 23—254 R |

MORRIS O. WOLK, Primary Examiner

R. M. REESE, Assistant Examiner